United States Patent
Alfieri

(10) Patent No.: US 7,401,759 B2
(45) Date of Patent: Jul. 22, 2008

(54) SINGLE-EFFECT SUBMARINE ACTUATOR FOR OPERATING VALVES

(75) Inventor: Giordano Alfieri, Parma (IT)

(73) Assignee: Biffi Italia S.R.L. (IT)

( * ) Notice: Subject to any disclaimer, the term of this patent is extended or adjusted under 35 U.S.C. 154(b) by 0 days.

(21) Appl. No.: 10/877,086

(22) Filed: Jun. 28, 2004

(65) Prior Publication Data

US 2006/0065866 A1    Mar. 30, 2006

(30) Foreign Application Priority Data

Jul. 23, 2003   (IT) .......................... PR2003A0059

(51) Int. Cl.
*F16K 31/12* (2006.01)
*F16K 31/53* (2006.01)

(52) U.S. Cl. .............................. 251/14; 251/58; 251/62; 251/250

(58) Field of Classification Search ................... 251/14, 251/58, 62, 248, 250
See application file for complete search history.

(56) References Cited

U.S. PATENT DOCUMENTS

| | | |
|---|---|---|
| 2,408,338 A | 9/1946 | Parsons |
| 4,034,958 A | 7/1977 | Masclet |
| 4,346,728 A * | 8/1982 | Sulzer ...................... 137/243.6 |
| 5,488,896 A | 2/1996 | Current |

FOREIGN PATENT DOCUMENTS

| | | |
|---|---|---|
| DE | 195 43 237 A | 5/1997 |
| EP | 0 434 935 A | 7/1991 |

* cited by examiner

*Primary Examiner*—Justine R. Yu
*Assistant Examiner*—Peter deVore
(74) *Attorney, Agent, or Firm*—Shlesinger & Fitzsimmons

(57) ABSTRACT

The invention relates to the field of the submarine valve actuators, and specifically to those actuators, that in order to effect a standard valve closing operation are connected to an oleo system feeding an hydraulic cylinder (1), whose plunger (3), by a mechanical link, operates the valve and compresses a spring (8) which provides for the standard opening operation. Said actuators are provided with an input shaft (21) for connectin a ROV for valve opening and closing operations when there is a failure in the oleo system. The connection between the ROV-operated input shaft (21) and the mechanical link between the piston (3) and the spring (8) is carried out by a planetary gear reducer (15).

10 Claims, 3 Drawing Sheets

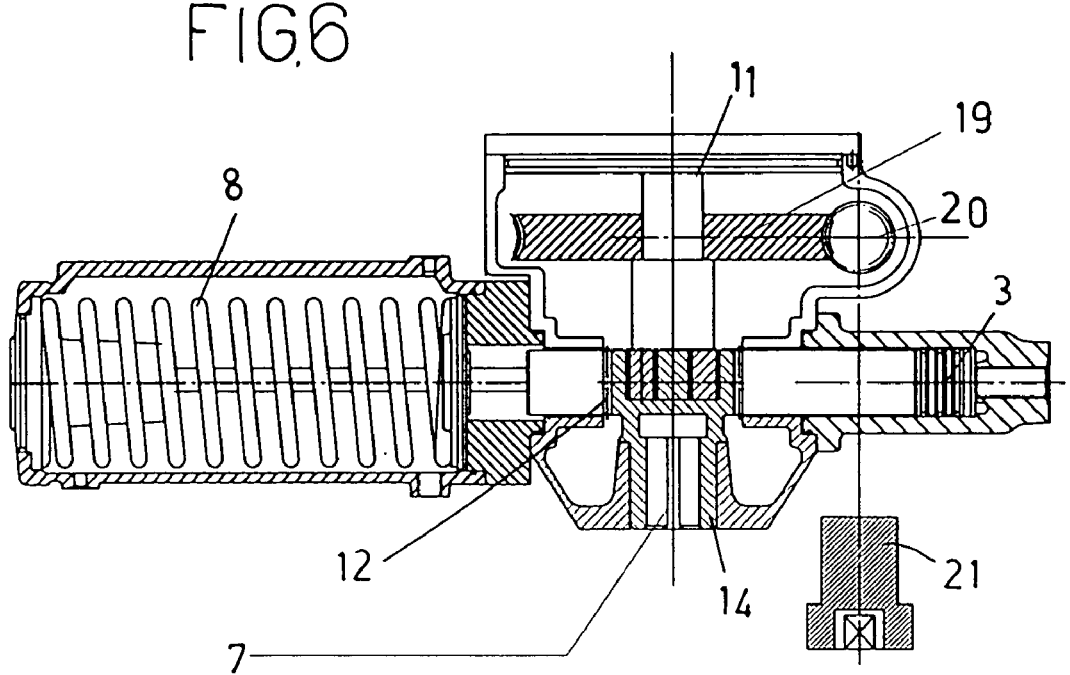
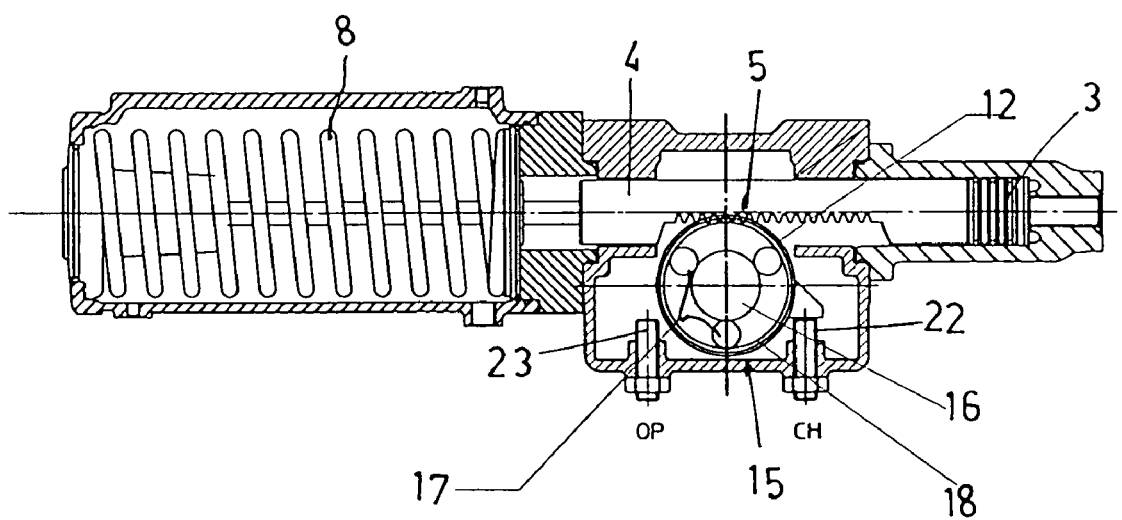

SINGLE-EFFECT SUBMARINE ACTUATOR FOR OPERATING VALVES

The present invention refers to a single-effect submarine actuator for operating valves.

Submarine actuators to be operated in normal or emergency conditions by remote controlled submarine vehicles, known as Remote Operator Vehicle or commonly called ROV, are known.

Said submarine actuators comprise a plunger connected to an oleo system which originates from the base and it is operated to close the valve during a standard operative condition. To this end, the plunger is connected to a rod which in turn compresses a spring which will be used for the opening operation.

The rod is connected by mechanical links to the valve handling shaft. For opening the valve in normal conditions, the oleo system is discharged so that the spring can overcome the oil pressure and can move the plunger and rod in the opposite direction.

Some conditions can occur in which the oleo system which connects the base and the valve is interrupted because has been crushed; in this case it is impossible to drain oil in the actuator and the spring is prevented to move by the spring thrust.

With the commercially available actuators, the opening operation is carried out only by cutting the oil feeding pipe in order to lower the pressure allowing the spring to act.

This approach is not certainly the best because it is polluting and requires to replace the tube.

Object of the present invention is to open or close the valve by a ROV even though the cylinder is pressurized and its pressure can not reduced due to casualties.

Another object consists of making the ROV shaft torque value exclusively dependent on the torque value for rotating the valve without being affected by the spring force.

These objects are completely met by the single-effect submarine actuator for operating valve of the present invention which is characterized by the attached claims and specifically is characterized by the fact it is provided with a planetary gear reducer connecting the ROV clutch shaft and the rod or shaft which is movable by the hydraulic cylinder or by the compressed spring.

These and other characteristics will be better understood by the following specification of a preferred (although not exclusively) embodiment shown for the sake of clarity in a non limiting way in the following drawings, wherein:

FIG. 2 show as FIG. 1 the actuator closed by the spring in a safety state;

FIG. 6 is a plan section of the actuator.

Figure 1:
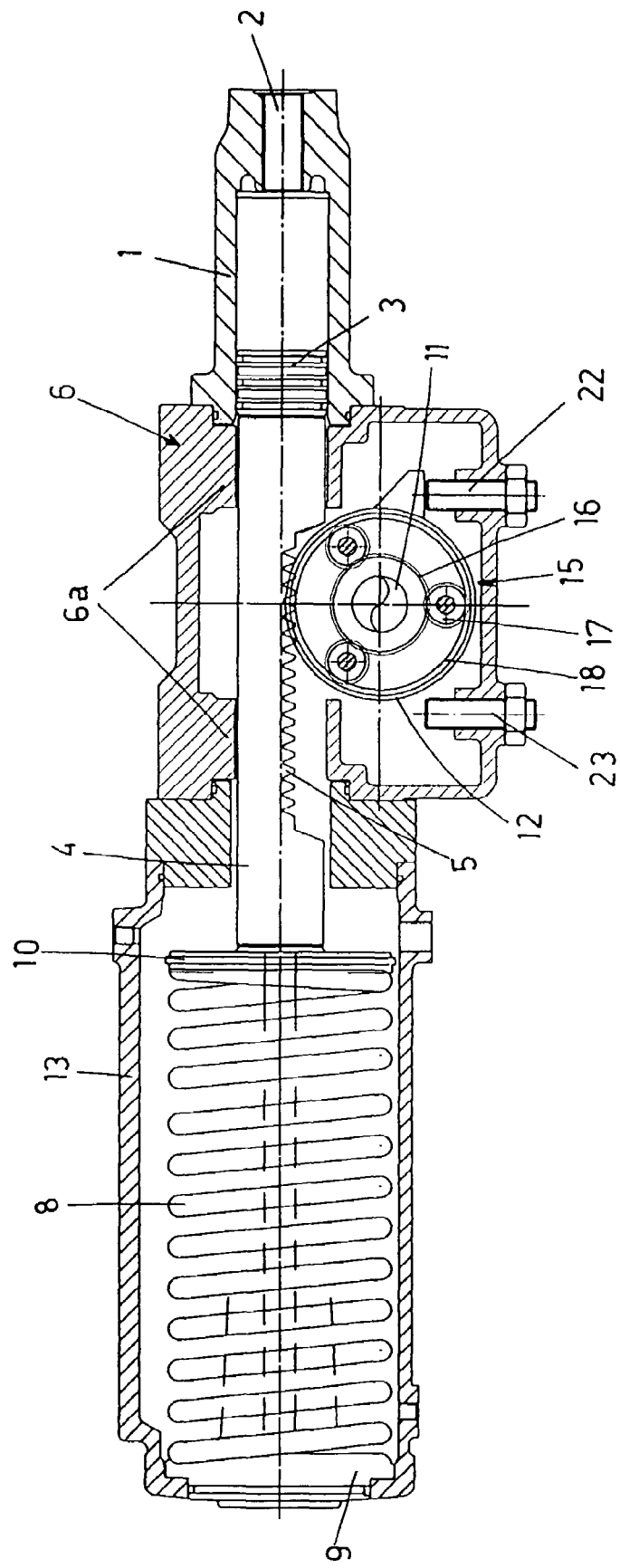
FIG. 1 shows in a longitudinal section the actuator opened by oil and to be closed by ROV.

With reference to the figures, 1 is an hydraulic cylinder whose head is connected, by a channel 2, to an oleo system which is connected to a base receiving an hydraulic pumping block.

A plunger 3 pressing a shaft 4 provided with a rack 5, is slidably received in the cylinder.

Shaft 4 is guided between two shoulders 6a of the housing 6 receiving an output shaft 14 perpendicular to shaft 4 provided with a coupling 7 for the shaft of a not shown valve.

8 is a coil spring received in a cylindrical casing 13 between a head shoulder 9 and a disk 10 pressed by shaft 4, so that the plunger 3 sliding results in a compression of said spring.

The linear movement of the hydraulic cylinder plunger or coil spring causes a rack translation and consequently a rotatory movement of main pinion 12 connected to the coupling 7.

The main pinion 12 movement is transferred to the output shaft 14 and consequently to valve shaft via a planetary gear reducer shown at 15.

The planetary gear reducer 15 comprises three basic elements:
a sun pinion 16,
a follower with a plurality of planets 17;
a female gear 18 inside the main pinion 12.

According to the operative principle of a planetary gear reducer, one of its three elements must be stationary; in the above described example, the sun pinion 16 is directly connected, by a coupling shaft 11, to a wheel 19 driven by shaft 20 which is rotated by the ROV input shaft 21.

The follower is directly connected to the valve coupling.

The female gear 18 is the inner part of the sun pinion 12, rack and coupling pinion.

22 and 23 are two limit stops of the closing position and opening position respectively.

The operation will be described with reference to three working hypotesis.

Automatic operation with normal working condition.

In FIG. 2, the spring keeps the actuator in a position to keep the valve closed against the right limit stop 22.

The opening is carried out by feeding oil into the cylinder and the plunger in turn moves the rack which compresses the spring.

In this operative state, the pinion 16 is the stationary element because is connected by 19 and 20 of ROV with a self-locking feature.

The female gear is the drive element driven by the sun pinion via the rack.

The follower is the driven element which transmits the movement to the valve shaft.

Figure 3:
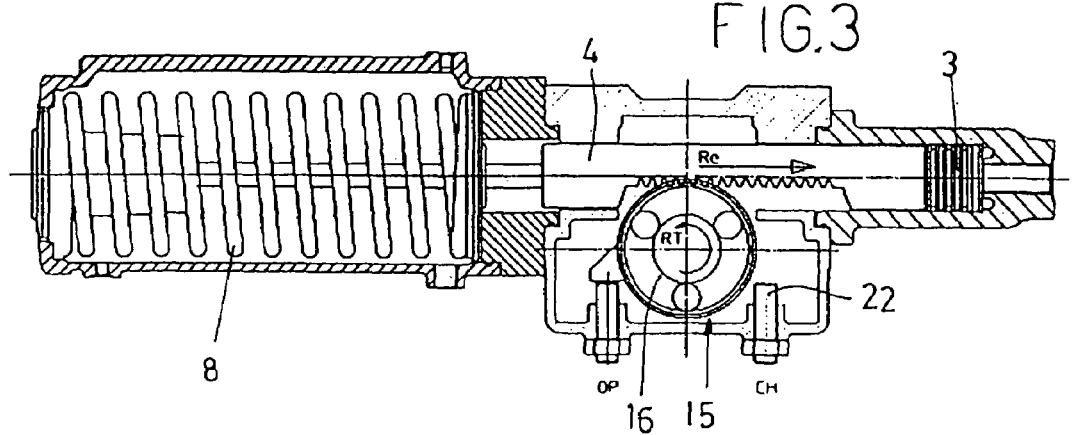
FIG. 3 shows as FIG. 1 the actuator closed by the spring which is going to be opened by ROV.
Figure 4:
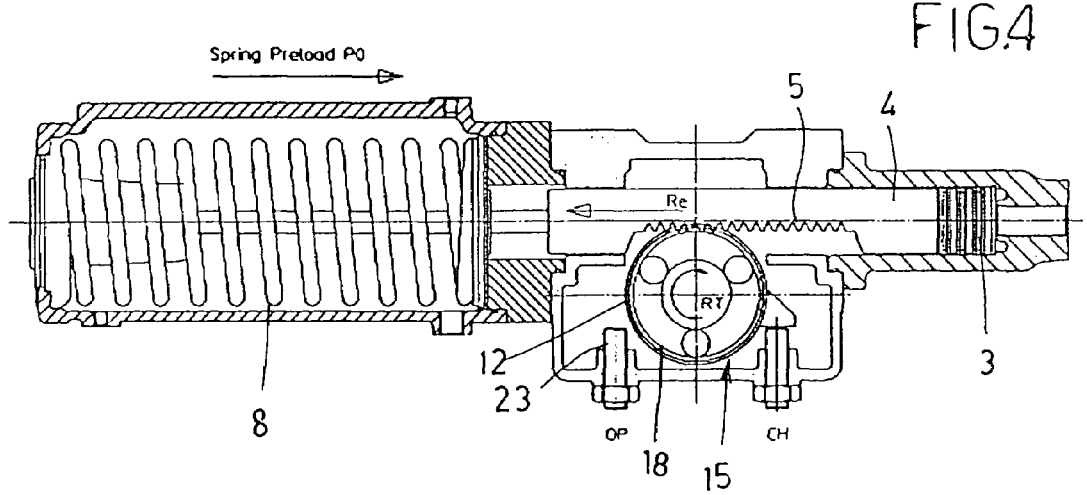
FIG. 4 shows as FIG. 1 the actuator opened by ROV which is going to be closed by ROV.
Figure 5:
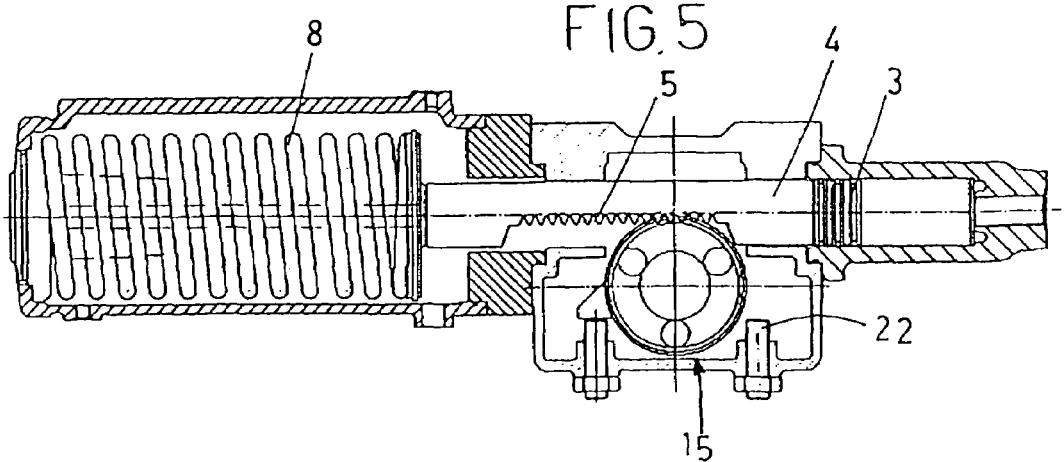
FIG. 5 shows as FIG. 1 the actuator in an opened state with pressurized oil.

Operation by the ROV (FIGS. 3, 4, and 1)

In this state, the pinion 16 acts as a drive element because is connected to the reducer 19 and 20 of the ROV.

The female gear 18 is the stationary element because it is fixed to the sun pinion 12 and in turn to the rack 5.

The follower is the driven element that which in turn drives the coupling element of the valve 7.

With reference to FIG. 1, in an emergency state, the actuator is opened by oil with the spring compression, In case of a failure of the oil main line, it is no more possible to discharge oil from the hydrualic cylinder, the closing position can be reached only by the ROV.

The invention claimed is:

1. Single-action submarine actuator for operating valves of a type comprising:
an hydraulic cylinder including a plunger;
a spring;
a first shaft located between said hydraulic cylinder and said spring and including a rack, said shaft being selectively actuated by the plunger of the hydraulic cylinder to open the valve, and biased by the spring toward a closed position of the valve; and
the actuator further comprising an input shaft for selective connection to a ROV (Remote Operator Vehicle), the input shaft being mechanically connected to the rack of the first shaft by a planetary gear reducer.

2. Actuator according to claim 1, further comprising a main pinion which can be rotated by at least one of the rack and a ROV, said main pinion being internally provided with a female gear connected by planetary gears to a sun pinion connected by a toothed return element to the ROV input shaft.

3. Actuator according to claim 1, characterized by the fact that it comprises two limit stops defining the valve closing position and valve opening position, respectively.

4. A single-action submarine valve actuator comprising:
a first shaft including a rack;
a hydraulic cylinder coaxial with the first shaft and including a plunger that engages a first end the first shaft, hydraulic action on the plunger urging the first shaft toward an open position of the valve;
a spring engaging a second end of the first shaft and biasing the first shaft toward a closed position of the valve; and
an input shaft selectively engaged by a Remote Operator Vehicle (ROV) and connected to the rack of the first shaft to selectively urge the first shaft toward at least one of the open and closed positions.

5. The actuator of claim 4 further comprising a planetary gear reducer between the rack and the input shaft.

6. The actuator of claim 5 further comprising:
a main pinion including external teeth and internal teeth, the external teeth engaging the rack;
a plurality of planet gears mounted in a follower and including external teeth engaging the internal teeth of the main pinion;
a sun pinion including external teeth engaged by the teeth of the planet gears.

7. The actuator of claim 6 wherein the follower is connected to a coupling that can be attached to another valve.

8. The actuator of claim 6 wherein the sun pinion is mounted on an end of the input shaft.

9. The actuator of claim 4 further comprising:
an input gear mounted on the input shaft and including external teeth;
an input wheel selectively rotated by the ROV and including worm teeth engaging the external teeth of the input gear such that the input gear rotates when the input wheel is rotated by the ROV and the input wheel is substantially stationary when torque is applied to the input shaft.

10. The actuator of claim 9 wherein the input gear is mounted on one end of the input shaft and the rack is adjacent an opposite end of the input shaft.

\* \* \* \* \*